(12) United States Patent
Aramaki et al.

(10) Patent No.: US 12,131,843 B2
(45) Date of Patent: Oct. 29, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Miyu Aramaki, Mie (JP); Yasuo Omori, Mie (JP); Housei Mizuno, Mie (JP)

(73) Assignees: AutoNetworks Technologies, Ltd., Mie (JP); Sumitomo Wiring Systems, Ltd., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 102 days.

(21) Appl. No.: 17/766,447

(22) PCT Filed: Aug. 28, 2020

(86) PCT No.: PCT/JP2020/032569
§ 371 (c)(1),
(2) Date: Apr. 4, 2022

(87) PCT Pub. No.: WO2021/075163
PCT Pub. Date: Apr. 22, 2021

(65) Prior Publication Data
US 2023/0028129 A1   Jan. 26, 2023

(30) Foreign Application Priority Data
Oct. 18, 2019   (JP) .................................. 2019-190726

(51) Int. Cl.
*H01B 7/02*   (2006.01)
*H01B 7/08*   (2006.01)
(Continued)

(52) U.S. Cl.
CPC .................. *H01B 7/02* (2013.01); *H01B 7/08* (2013.01); *H01B 7/18* (2013.01); *H01R 11/09* (2013.01)

(58) Field of Classification Search
CPC .......... H01B 7/02; H01B 7/08; H01B 7/0823; H01B 7/18; H01R 11/09; H01R 13/02; H01R 43/16
(Continued)

(56) References Cited

U.S. PATENT DOCUMENTS

| 3,819,848 A | 6/1974 | Fry |
| 6,392,148 B1 * | 5/2002 | Ueno .................... H01R 12/613 174/72 A |

(Continued)

FOREIGN PATENT DOCUMENTS

| CN | 101454953 | 6/2009 |
| CN | 104701641 | 6/2015 |

(Continued)

OTHER PUBLICATIONS

International Search Report issued in International Patent Application No. PCT/JP2020/032569, dated Nov. 17, 2020, along with an English translation thereof.

(Continued)

*Primary Examiner* — William H. Mayo, III
(74) *Attorney, Agent, or Firm* — Greenblum & Bernstein, P.L.C.

(57) ABSTRACT

A wiring member includes: at least one first cover wire; at least one second cover wire; and a first sheet to which at least the first cover wire is fixed. A first hole is formed in the first sheet. A connection part where a core wire of the first cover wire and a core wire of the second cover wire are connected is located in a region where the first hole is formed.

15 Claims, 7 Drawing Sheets

(51) Int. Cl.
  *H01B 7/18* (2006.01)
  *H01R 11/09* (2006.01)

(58) Field of Classification Search
  USPC ......... 174/72 A, 110 R, 113 R, 117 R, 117 F, 174/117 FF
  See application file for complete search history.

(56) References Cited

U.S. PATENT DOCUMENTS

| | | | |
|---|---|---|---|
| 2004/0003938 A1* | 1/2004 | Yoshida | H01R 12/616 |
| | | | 174/117 F |
| 2007/0087620 A1 | 4/2007 | Yamamoto | |
| 2009/0318002 A1 | 12/2009 | Murano et al. | |
| 2016/0036151 A1* | 2/2016 | Tominaga | H01R 43/16 |
| | | | 29/874 |
| 2019/0392963 A1 | 12/2019 | Ishida et al. | |

FOREIGN PATENT DOCUMENTS

| | | | |
|---|---|---|---|
| EP | 0895306 | 2/1999 | |
| JP | 48-044786 | 6/1973 | |
| JP | 55-096516 | 7/1980 | |
| JP | 60-84075 U | 6/1985 | |
| JP | 04-087110 | 3/1992 | |
| JP | 7-142142 | 6/1995 | |
| JP | 07-142142 A * | 6/1995 | ............ H01R 43/02 |
| JP | 08-017259 | 1/1996 | |
| JP | 09-102332 | 4/1997 | |
| JP | 09-115558 | 5/1997 | |
| JP | 2001-258125 | 9/2001 | |
| JP | 2002-367438 | 12/2002 | |
| JP | 2009-277414 | 11/2009 | |
| JP | 2013-115138 | 6/2013 | |
| JP | 2014-175063 | 9/2014 | |
| JP | 2018-137208 | 8/2018 | |
| WO | 2012/111759 | 8/2012 | |

OTHER PUBLICATIONS

International Preliminary Report on Patentability issued in International Patent Application No. PCT/JP2020/032569, dated Apr. 28, 2022, along with an English translation thereof.

Japan Office Action issued in Japan Patent Application No. 2019-190726, dated Oct. 4, 2022, along with an English translation thereof.

Japan Office Action issued in Japan Patent Application No. 2023-14529, dated Oct. 24, 2023, along with an English translation thereof.

China Office Action issued in China Patent Application No. 202080071194.8, dated Aug. 11, 2023, along with an English translation thereof.

Office Action issued in Japan Patent Application No. 2023-014529, dated May 14, 2024, together with English translation thereof.

* cited by examiner

WIRING MEMBER

TECHNICAL FIELD

The present disclosure relates to a wiring member.

BACKGROUND ART

Patent Document 1 discloses a wire harness in which an electrical wire is welded to a functional exterior member formed into a sheet-like shape.

PRIOR ART DOCUMENTS

Patent Documents

Patent Document 1: Japanese Patent Application Laid-Open No. 2018-137208

SUMMARY

Problem to be Solved by the Invention

It is desired that electrical wires are connected in a certain position in a sheet.

Accordingly, an object is to provide a technique of easily connecting electrical wires in a certain position in a sheet.

Means to Solve the Problem

A wiring member according to the present disclosure is a wiring member including: at least one first cover wire; at least one second cover wire; and a first sheet to which at least the first cover wire is fixed, wherein at least one first hole is formed in the first sheet, and at least one connection part where a core wire of the first cover wire and a core wire of the second cover wire are connected is located in a region where the first hole is formed.

Effects of the Invention

According to the present disclosure, electrical wires are easily connected in a certain position in a sheet.

DESCRIPTION OF EMBODIMENT(S)

Description of Embodiment of Present Disclosure

Embodiments of the present disclosure are listed and described firstly.

A wiring member according to the present disclosure is as follows.

(1) A wiring member includes: at least one first cover wire; at least one second cover wire; and a first sheet to which at least the first cover wire is fixed, wherein at least one first hole is formed in the first sheet, and at least one connection part where a core wire of the first cover wire and a core of the second cover wire are connected is located in a region where the first hole is formed. The first cover wire and the second cover wire can be connected in the region where the first hole is formed. The cover wires are easily connected in a certain position in a sheet.

(2) The core wires may be welded in the connection part. Accordingly, a component for connecting the core wires is unnecessary in the connection part.

(3) The connection part may be provided in an intermediate portion of the first cover wire. Accordingly, an intermediate splice can be simply provided in a certain position where the sheet is located.

(4) The connection part may be provided in an end portion of the first cover wire. Accordingly, the end portion of the electrical wire can be connected.

(5) It is also applicable that a covering layer is provided closer to a tip side of the end portion of the first cover wire than the core wire, and the covering layer is fixed to the first sheet. Accordingly, the core wire in the end portion of the first cover wire is easily positioned in a position of the first hole.

(6) The core wire of the first cover wire and the core wire of the second cover wire may intersect with each other. Accordingly, the core wires are easily connected.

(7) The second cover wire may be fixed to the first sheet. Accordingly, the electrical wires fixed to the same sheet can be connected.

(8) It is also applicable that the wiring member further includes a second sheet to which the second cover wire is fixed, wherein a second hole is formed in the second sheet, and the first sheet and the second sheet are stacked so that the first hole and the second hole overlap with each other. Accordingly, the electrical wires fixed to the different sheets can be connected.

(9) The first sheet and the second sheet may extend from a position of the connection part in directions intersecting with each other. Accordingly, a branch extending in the different directions is simply formed.

(10) The plurality of connection parts are provided, and arranged in a step-like form. Accordingly, intersection of the covering layer of the first cover wire with the covering layer of the second cover wire can be suppressed. Accordingly, increase in thickness dimension of the wiring member can be suppressed.

(11) it is also applicable that the wiring member further includes at least one wire-like transmission member, wherein the wire-like transmission member is fixed to the first sheet, and is not connected to the first cover wire and the second cover wire, the second cover wire extends from the connection part to one side, and the wire-like transmission member is disposed in another side of the connection part. Accordingly, intersection of the wire-like transmission member with the first cover wire and the second cover wire can be suppressed. Accordingly, increase in thickness dimension of the wiring member can be suppressed.

(12) The first sheet and the second sheet may extend from a position of the connection part in an identical direction. Accordingly, the electrical wires disposed in different layers in the electrical wires extending in the same direction can be connected.

(13) An insulation cover part covering the connection part may be provided. Accordingly, a short circuit can be suppressed in the connection part.

(14) The insulation cover part may include a portion formed by folding a part of the first sheet. Accordingly, the insulation cover part can be simply provided.

(15) It is also applicable that a bending region part including a portion extending to be bended along the first cover wire is provided in the first sheet, and the insulation cover part is provided in a portion inwardly bended in the bending region part. A yield of the sheet tends to be reduced in the bending region part. The insulation cover part is provided in the portion inwardly bended in the bending region part, thus the yield of the sheet can be improved.

(16) It is also applicable that the plurality of first holes are formed in the first sheet, and the insulation cover part partitions the connection part in a position between the plurality of first holes. Accordingly, a short circuit in the plurality of connection parts is suppressed.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 1:
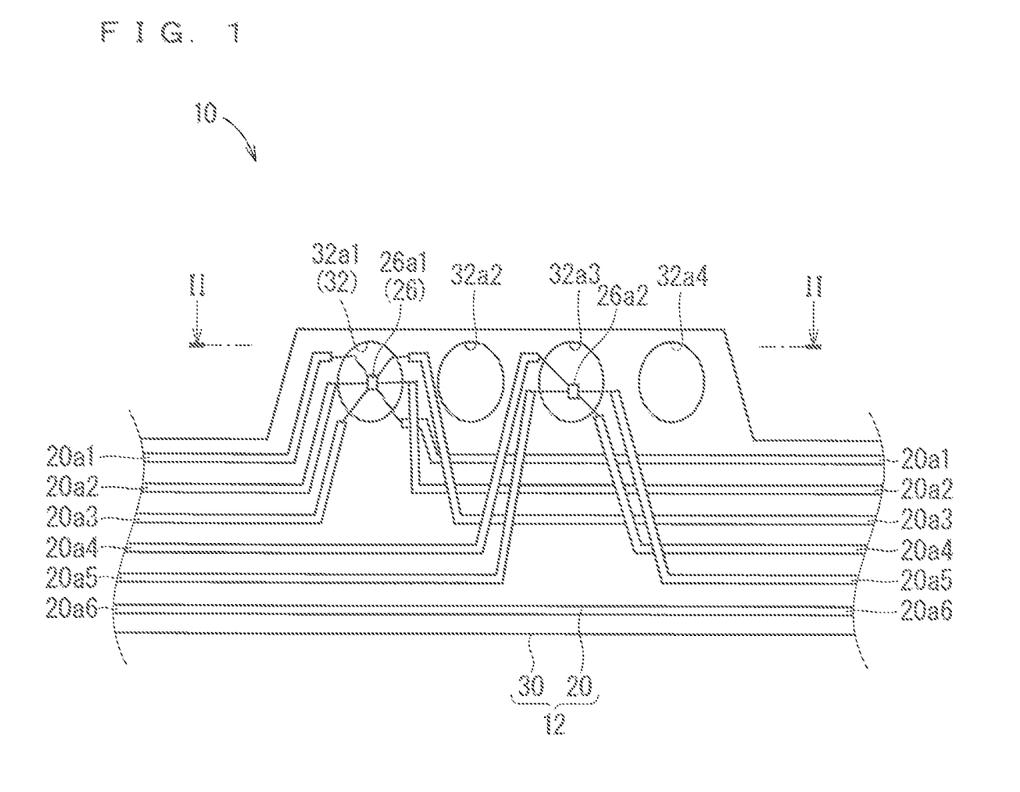
FIG. 1 is a plan view illustrating a wiring member according to an embodiment 1.
Figure 2:
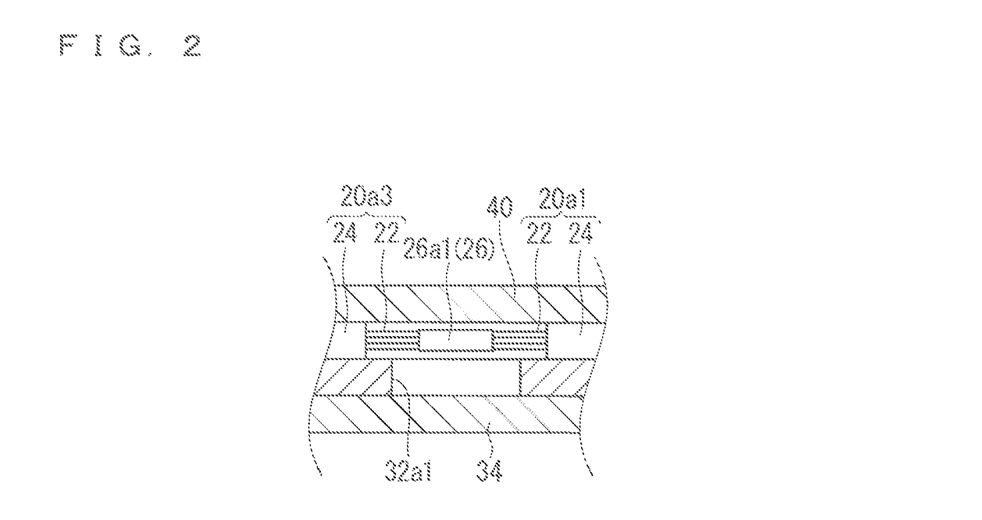
FIG. 2 is a cross-sectional view of the wiring member cut along a II-II line in FIG. 1.
Figure 3:
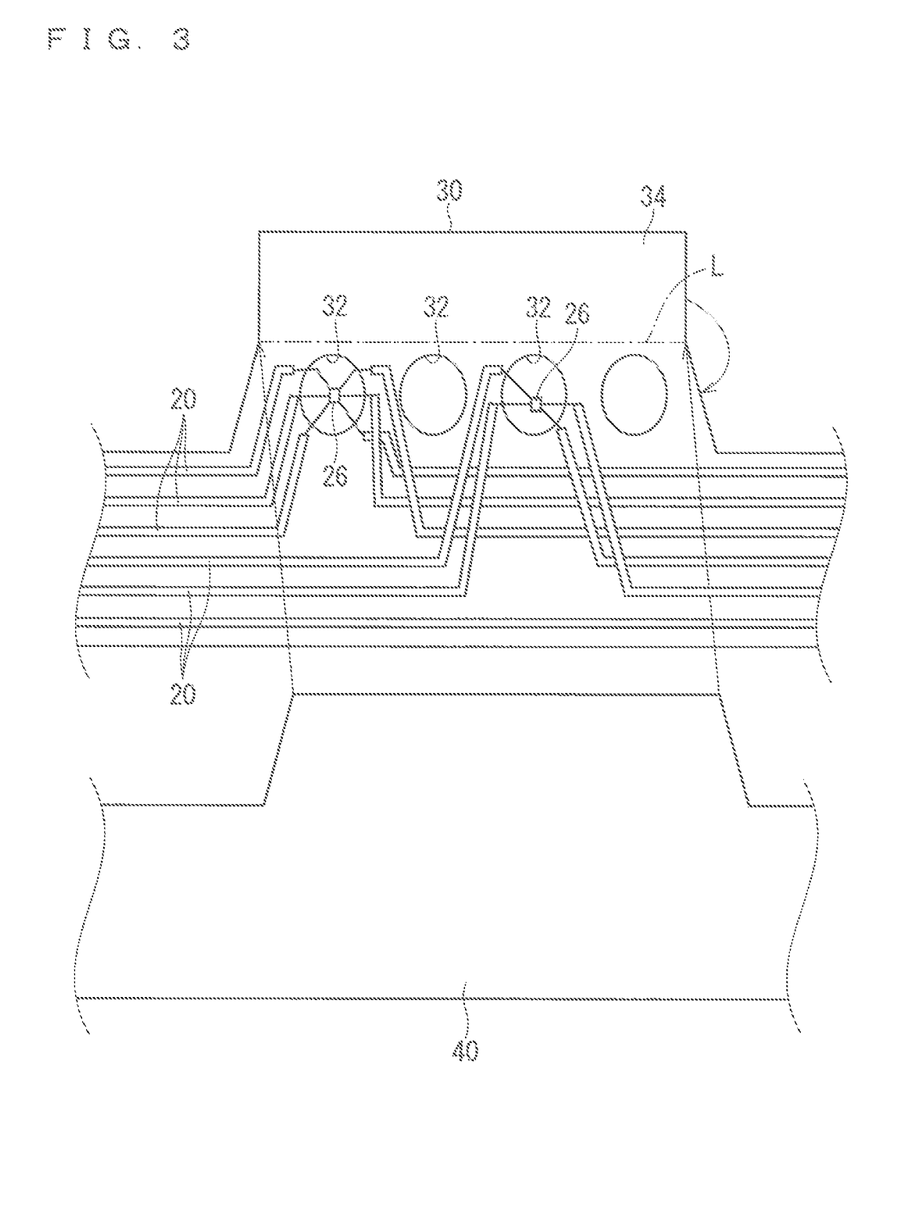
FIG. 3 is an explanation diagram illustrating a manufacture of the wiring member according to the embodiment 1.

A wiring member 10 according to an embodiment 1 is described hereinafter. FIG. 1 is a plan view illustrating the wiring member 10 according to the embodiment 1. FIG. 2 is a cross-sectional view of the wiring member 10 cut along a II-II line in FIG. 1. FIG. 3 is an explanation diagram illustrating a manufacture of the wiring member 10 according to the embodiment 1. A cover 40 is omitted in FIG. 1.

The wiring member 10 includes a plurality of cover wires 20, a sheet 30, and the cover 40. The sheet 30 is formed into a flat shape as a whole. The plurality of cover wires 20 are fixed on the sheet 30, thus the wiring member 10 is kept in a flat state, the cover wire 20 fixed to the sheet 30 is referred to as a wiring body 12 in some cases. The cover 40 covers the cover wire 20 from a side opposite to the sheet 30.

The plurality of cover wires 20 are members electrically connecting components in a vehicle. A connector, for example, is provided on an end portion of the cover wire 20. This connector is connected to a connector provided in the other side component, thus the cover wire 20 is connected to the other side component. That is to say, the present wiring member 10 is used as a wiring member 10 electrically connecting various types of component in a vehicle, for example. The connector may be fixed to the sheet 30.

A route of the plurality of cover wires 20 is set in accordance with a position of a component as a connection destination of the cover wire 20. The plurality of cover wires 20 are fixed to the sheet 30, thus the plurality of cover wires 20 are kept in a form following a wiring route corresponding to a position of a component as a connection destination of each cover wire 20. The plurality of cover wires 20 may be fixed to the sheet 30 in a state where a branch wire part is branched from a main wire part.

The cover wire 20 includes a core wire 22 and a covering layer 24. The core wire 22 includes one or a plurality of strands. The strand is made up of a conductor such as copper or aluminum formed into a wire-like shape. The covering layer 24 covers around the core wire 22. The covering layer 24 is an insulation body such as resin. The covering layer 24 is formed by extrusion molding a softened insulation material around the core wire 22, for example.

The cover wire 20 may be various kinds of signal lines or various kinds of power lines. Some of the cover wires 20, for example, may be used as an antenna or coil, for example, transmitting or receiving a signal or electrical power to or from a space.

FIG. 1 illustrates six cover wires 20. The six cover wires 20 are referred to as cover wires 20a1 to 20a6 in some cases when they needs to be distinguished.

The sheet 30 keeps the plurality of cover wires 20 in a state be being arranged side by side. The plurality of cover wires 20 are fixed to a main surface of the sheet 30. The sheet 30 may be a resin sheet. For example, the sheet 30 may be formed of resin such as polyvinyl chloride (PVC), polyethylene (PE), polypropylene (PP), or polyethylene terephthalate (PET). The sheet 30 is also considered a non-woven cloth or a foamed sheet, for example. The sheet 30 may have a single layer structure, or may also have a multilayer structure. The sheet 30 may include a metal layer. The sheet 30 is an example of a first sheet.

A fixing state of fixing the cover wire 20 to the sheet 30 is not particularly limited as long as the cover wire 20 is fixed to the sheet 30. Applicable as the fixing state are a contact area fixation and a non-contact area fixation, or both fixations may be used together. Herein, the contact area fixation indicates that a portion where the cover wire 20 and the sheet 30 have contact with each other is stuck and fixed. The non-contact area fixation is a fixing state which is not the contact area fixation, and indicates that a sewing thread, a cover, or an adhesive tape presses the cover wire 20 toward the sheet 30 or sandwiches the cover wire 20 and the sheet 30 to keep them in a fixing state. In the description hereinafter, the cover wire 20 and the sheet 30 are in the state of the contact area fixation.

Applicable as the configuration of the contact area fixation are a contact area indirect fixation and a contact area direct fixation, or both fixations may also be used together in different regions. Herein, the contact area indirect fixation indicates that the cover wire 20 and the sheet 30 are indirectly stuck and fixed via an adhesive agent, a gluing agent, and a double-sided adhesive tape provided therebetween. The contact area direct fixation indicates that the cover wire 20 and the sheet 30 are directly stuck and fixed without an intervention of the adhesive agent, for example, which is separately provided. Considered in the contact area direct fixation is that resin included in at least one of the cover wire 20 and the sheet 30 is melted, thus the cover wire 20 and the sheet 30 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the cover wire 20 and the sheet 30 are in the state of the contact area direct fixation by these means. Specifically, when the state of the contact area direct fixation is formed by the ultrasonic welding, for example, the cover wire 20 and the sheet 30 are in the state of the contact area direct fixation by the ultrasonic welding.

In the description hereinafter, the cover wire 20 and the sheet 30 are in the state of the contact area direct fixation.

Each cover wire 20 may be fixed to the sheet 30 at a plurality of positions at intervals along a longitudinal direction. Each cover wire 20 may be wholly fixed to the sheet 30 continuously along a longitudinal direction. Herein, the covering layer 24 of the cover wire 20 and the sheet 30 are fixed by the contact area direct fixation, thus a portion of the cover wire 20 fixed to the sheet 30 is a portion where the covering layer 24 is provided.

A hole 32 is formed in the sheet 30. The hole 32 is formed in a position in the sheet 30 deviating to a lateral side from a route along which the cover wire 20 extends straight. A width dimension of the sheet 30 is partially larger in a portion where the hole 32 is formed than in a portion where the hole 32 is not formed. The plurality of holes 32 are disposed collectively in one position. Accordingly, the plurality of holes 32 may be easily covered by one insulation cover part. Needless to say, the hole 32 may be located on the route along which the cover wire 20 extends straight. The plurality of holes 32 may be dispersedly disposed. FIG. 1 illustrates four holes 32. When the four holes 32 need to be distinguished, they are referred to as the holes 32a1 to 32a4 in some cases.

A connection part 26 is located in a region where the hole 32 is formed. The connection part 26 is a portion where the core wires 22 in the plurality of cover wires 20 are electrically connected. FIG. 1 illustrates two connection parts 26. When the two connection parts 26 need to be distinguished, they are referred to as the connection parts 26a1 and 26a2 in some cases.

The cover wires 20a1, 20a2, and 20a3 are connected in the connection part 26a1. The cover wires 20a1, 20a2, and 20a3 are connected in an intermediate portion. Herein, a state where the cover wire 20 is connected in the intermediate portion indicates a case where both end portions of the cover wire 20 are connected to the other connection destination, respectively. Intermediate portions of the cover wires 20a1, 20a2, and 20a3 are peeled, thus the core wires 22 are exposed, for example. The exposed core wires 22 are connected to form the connection part 26. The connection part 26a1 is located in a region where the hole 32a1 is formed.

A state where the connection part 26 is located in a region where the hole 32 is formed indicates that the connection part 26 is located in a position of the hole 32 in a plan view or the connection part 26 is located on a periphery of the hole 32 in a plan view. The covering layer 24 is fixed to the periphery of the hole 32 in the sheet 30 in a position near the exposed core wire 22. The exposed core wire 22 including the connection part 26 is not fixed to the sheet 30 but can be moved. Thus, the connection part 26 may be located in a position slightly deviating from the hole 32 in a plan view. The connection part 26 may be located inside or outside the hole 32 in a thickness direction of the sheet 30.

The cover wires 20a4 and 20a5 are connected in the connection part 26a2. The cover wires 20a4 and 20a5 are connected in intermediate portions. The intermediate portions of the cover wires 20a4 and 20a5 are peeled, thus the core wires 22 re exposed, for example. The exposed core wires 22 are connected to form the connection part 26a2. The connection part 26a2 is located in a region where the hole 32a3 is formed.

The core wires 22 of the plurality of cover wires 20 intersect with each other in each connection part 26. Herein, the plurality of cover wires 20 changes their arrangement and cross the hole 32, thus the core wires 22 intersect with each other. An example of the connection part 26a1 is described hereinafter.

In the example illustrated in FIG. 1, the cover wires 20a1, 20a2, and 20a3 are arranged in this order from an upper side on a left side of the hole 32a1 in the connection part 26a1. The cover wires 20a1, 20a2, and 20a3 are arranged in an order of the cover wires 20a3, 20a2, and 20a1 from the upper side on a right side of the hole 32a1. Accordingly, directions in which each of the cover wires 20a1, 20a2, and 20a3 cross the hole 32a1 can be different from each other, thus the core wires 22 of the cover wires 20a1, 20a2, and 20a3 can cross each other at a position of the hole 32a1. The order of the cover wires 20a3, 20a2, and 20a1 returns to the order of the cover wires 20a1, 20a2, and 20a3 from the upper side in a tip portion on the right side of the hole 32a1. Thus, the cover wires 20a1, 20a2, and 20a3 cross each other at a portion where the covering layer 24 is located to return the arrangement order. However, the cover wires 20a3, 20a2, and 20a1 may extend in this order from the upper side in the tip portion on the right side of the hole 32a1.

The core wires 22 are welded in each connection part 26. Accordingly, the core wires 22 are kept in a state of being connected to each other. The welding method is not particularly limited, but various welding method such as ultrasonic welding, resistance welding, or laser welding can be adopted. The connection state of the core wires 22 is not limited to welding, but various types of connection state can be adopted. For example, a terminal may be crimped to the core wires 22 to connect the core wires 22.

The core wires 22 are connected in the connection part 26 as described hereinafter, for example. An example of the connection part 26a2 is described hereinafter. Firstly, the cover wires 20a4 and 20a5 are wired and fixed on the sheet 30 along a predetermined route. At this time, the predetermined route includes a route crossing the bole 32a3. That is to say, the cover wires 20a4 and 20a5 are disposed to cross the hole 32a3. The portion of the cover wires 20a4 and 20a5 crossing the hole 32a3 is not fixed to the sheet 30. A peripheral part of the hole 32a3 in the cover wires 20a4 and 20a5 is fixed to the sheet 30. The portion of each of the cover wires 20a4 and 20a5 crossing the hole 32a3 is peeled. Accordingly, the core wire 22 of each of the cover wires 20a4 and 20a5 crossing the hole 32a3 is exposed. The exposed core wire 22 is positioned to cross the hole 32a3. In this state, a jig for connection is placed on the core wires 22 of the cover wires 20a4 and 20a5, thereby connecting the core wires 22 of the cover wires 20a4 and 20a5.

The jig is different depending on a connection method. When the connection method is ultrasonic welding, for example, the jig is a horn and an anvil of a ultrasonic welding machine. When the connection method is a terminal, for example, the jig is a crimper and an anvil of a terminal crimper. The core wire 22 is located in a position of the hole 32, thus these jigs can sandwich the core wires 22 from both sides in the thickness direction of the sheet 30 in a position of the hole 32.

A region in the cover wire 20 where the core wire 22 is exposed in FIG. 1 is larger than the hole 32. That is to say, the core wire 22 is exposed also in a portion of the cover wire 20 located on the periphery of the hole 32. A region in the cover wire 20 where the core wire 22 is exposed may be equal to or smaller than the hole 32.

One of the cover wires 20a1, 20a2, and 20a3 is a first cover wire, and the other one of them is a second cover wire. In the similar manner, one of the cover wires 20a4 and 20a5 is a first cover wire, and the other one of them is a second cover wire. It is sufficient that at least one first cover wire is included. It is sufficient that at least one second cover wire is included.

Herein, holes 32a2 and 32a4 where the connection part 26 is not located are provided. However, the holes 32a2 and 32a4 where the connection part 26 is not located need not be provided. The connection part 26 may be located in all of the holes 32.

The cover wire 20a6 is not connected to the cover wires 20a1, 20a2, 20a3, 20a4, and 20a5 in a certain position in the sheet 30. The cover wire 20a6 is an example of a wire-like transmission member which is not connected to the first cover wire and the second cover wire in a certain position where the sheet 30 is located. The wire-like transmission member may be a bare conductive wire, a shielded wire, a twisted wire, an enamel wire, a nichrome wire, a coaxial wire, or an optical fiber in addition to the cover wire 20 described above. The wire-like transmission member may be a wire-like member transmitting an electrical power or light, for example. The wire-like transmission member 20 may be a single wire-like object or a composite object of a plurality of wire-like objects (a twisted wire and a cable made up of a plurality of wire-like objects covered by a sheath). It is sufficient that at least one wire-like transmission member is included.

The cover 40 may be wholly or partially overlapped with the sheet 30. The cover 40 may be a resin sheet. For example, the cover 40 may be formed by resin such as PVC, PE, PP, or PET in the manner similar to the sheet 30. One of the sheet 30 and the cover 40 may be softer than the other one. The softness herein, or rigidity conversely, may also be evaluated by Rockwell hardness, for example. For example, it is applicable that the cover 40 is formed by a material such as rigid PVC, nylon, PET, or PP, and the sheet 30 is a soft member made up of a sheet-like member formed by soft PVC and a non-woven cloth formed by PET stacked on each other.

The wiring member 10 is provided with an insulation cover part covering the connection part 26. The insulation cover part includes a portion formed by folding a part of the sheet 30. In the present example, a side of the sheet 30 on which the cover wire 20 is disposed is covered by the cover 40. A side of the sheet 30 on which the cover wire 20 is not disposed is covered by a fold piece 34 of the sheet 30. Accordingly, the insulation cover part includes the cover 40 and the fold piece 34 of the sheet 30.

The fold piece 34 is folded back along a fold line L. A portion of the sheet 30 where the cover wire 20 is fixed is referred to as an electrical wire fixing part in some cases. Herein, the fold piece 34 is provided adjacent to a portion of the sheet 30 where the hole 32 is formed along the width direction. The fold piece 34 may be provided adjacent to a portion of the sheet 30 where the hole 32 is formed along the longitudinal direction. It is also applicable that the two fold pieces 34 are provided and cover a portion of the sheet 30 where the hole 32 is formed from both sides.

The fixing state of the sheet 30 and the cover 40 is not particularly limited, however, various types of fixing state of the sheet 30 and the cover wire 20 described above can be adopted. The fixing state of the sheet 30 and the cover 40 may be the same as or different from the fixing state of the sheet 30 and the cover wire 20.

The fixing state of the electrical wire fixing part and the fold piece 34 is not particularly limited, however, various types of fixing state of the sheet 30 and the cover wire 20 described above can be adopted. The fixing state of the electrical wire fixing part and the fold piece 34 may be the same as or different from the fixing state of the sheet 30 and the cover wire 20 and the fixing state of the sheet 30 and the cover 40.

According to the wiring member 10 having the above configuration, the cover wires 20 can be connected in the region where the hole 32 is formed. The cover wires 20 are easily connected in a certain position in the sheet 30. The cover wires 20 fixed to the same sheet 30 can be connected. The core wires 22 of the cover wires 20 intersect with each other, thus the core wire 22 can be easily connected.

The core wires 22 are welded in the connection part 26, thus a component for connecting the core wires 22 is unnecessary in the connection part 26. However, the core wires 22 may be connected using the other component such as a terminal in the connection part 26.

The connection part 26 is provided in the intermediate portion of the cover wire 20, thus an intermediate splice can be simply provided in a position where the sheet 30 is located. An end portion of one of the cover wires 20a1 to 20a3 may be connected in the connection part 26. In the similar manner, an end portion of one of the cover wires 20a4 and 20a5 may be connected in the connection part 26.

The insulation cover part is provided, thus a short circuit can be suppressed in the connection part 26. The insulation cover part includes a portion formed by folding a part of the sheet 30, thus the insulation cover part can be simply provided.

Embodiment 2

Figure 4:
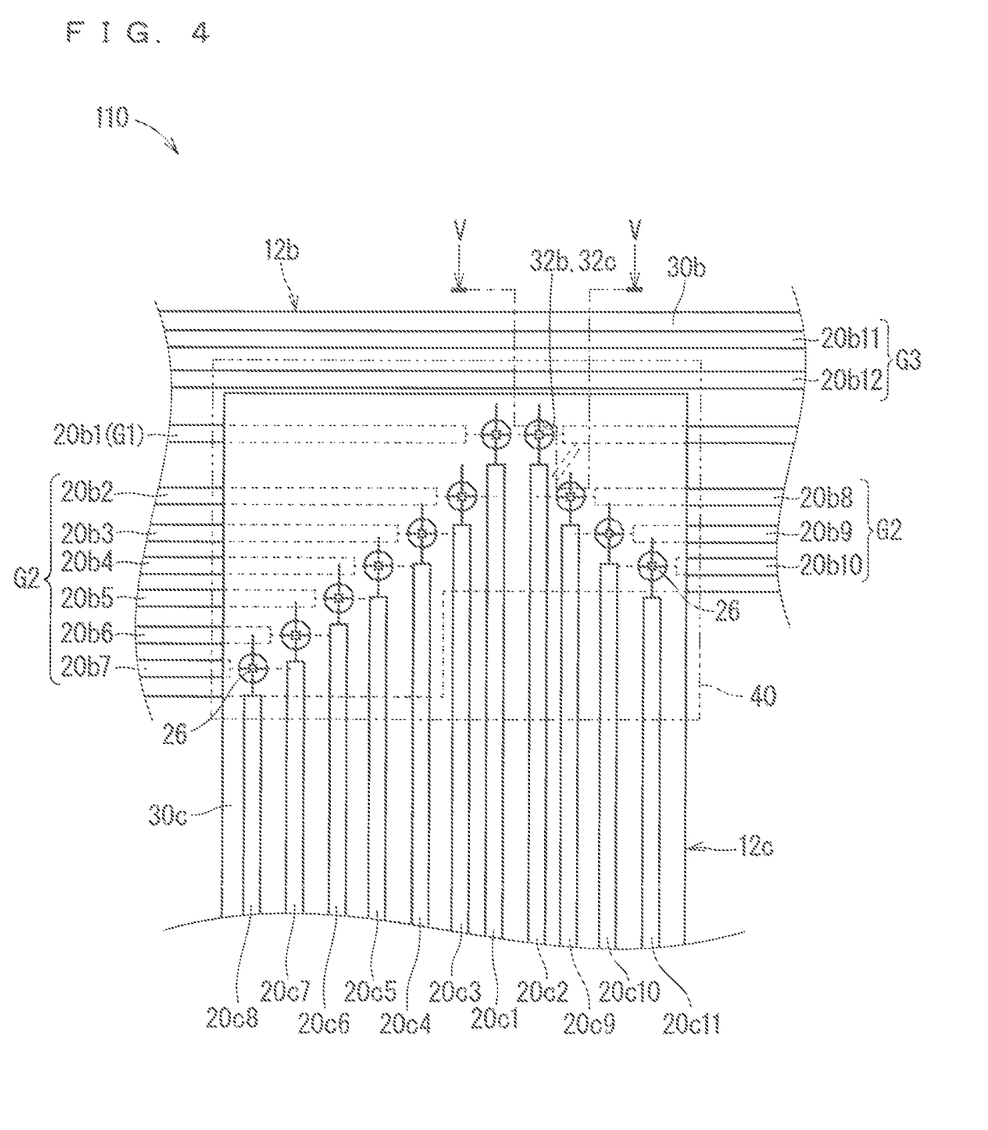
FIG. 4 is a plan view illustrating a wiring member according to an embodiment 2.
Figure 5:
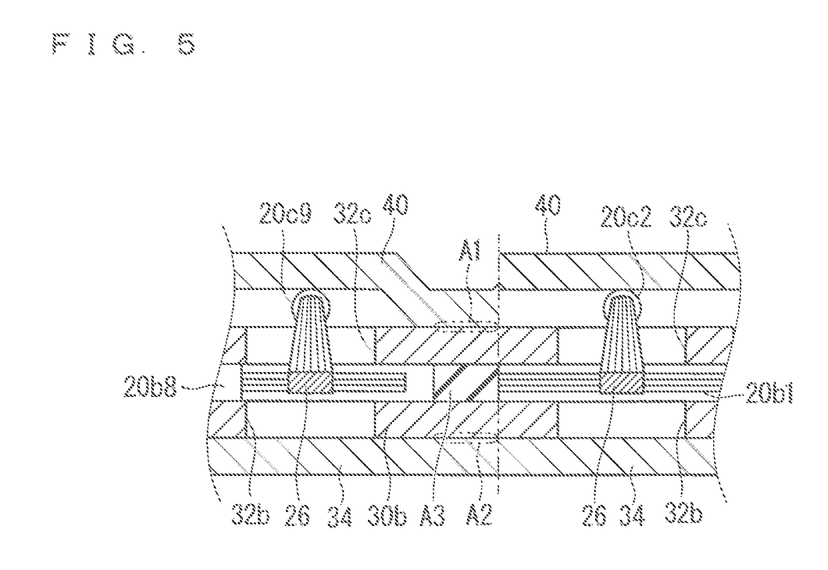
FIG. 5 is a cross-sectional view of the wiring member cut along a V-V line in FIG. 4.
Figure 6:
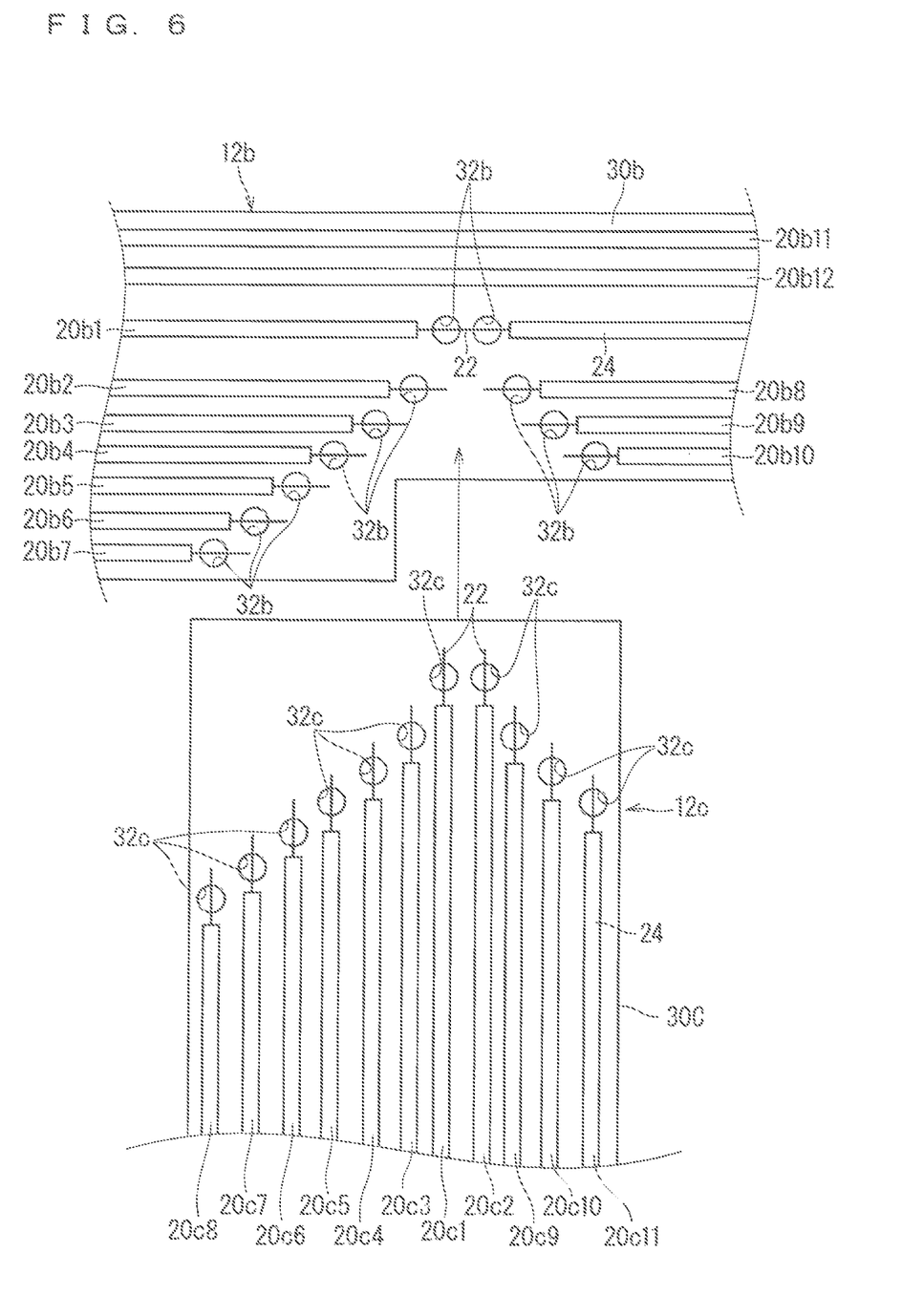
FIG. 6 is an explanation diagram illustrating a manufacture of the wiring member according to the embodiment 2.

A wiring member according to an embodiment 2 is described. FIG. 4 is a plan view illustrating a wiring member 110 according to the embodiment 2. FIG. 5 is a cross-sectional view of the wiring member cut along a V-V line in FIG. 4. FIG. 6 is an explanation diagram illustrating a manufacture of the wiring member 110 according to the embodiment 2. In the following description of the present embodiment, the same reference numerals are assigned to the similar constituent elements described above, and the description thereof will be omitted.

The wiring member 110 includes a plurality of wiring bodies 12b and 12c. The wiring body 12b includes a plurality of cover wires 20b1 to 20b12 and a sheet 30b. The wiring body 12c includes a plurality of cover wires 20c1 to 20c11 and a sheet 30c. The plurality of wiring bodies 12b and 12c are partially stacked.

Twelve cover wires 20b1 to 20b12 are illustrated in the wiring body 12b. The twelve cover wires 20b1 to 20b12 are divided into three groups of cover wire groups G1, G2, and G3 described hereinafter. That is to say, the cover wire group G1 is a group of the cover wire 20 in which the core wires 22 are exposed in the intermediate portions. One cover wire 20*b*1 belongs to the cover wire group G1. The cover wire group G2 is a group of the cover wire 20 in which the core wires 22 are exposed in the end portions. Nine cover wires 20*b*2 to 20*b*10 belong to the cover wire group G2. The cover wires 20*b*2 to 20*b*7 and the cover wires 20*b*8 to 20*b*10 extend from the connection part 26 in directions opposite to each other. The cover wire group G3 is a group of the cover wire 20 in which the core wires 22 are not exposed in a certain position of the sheet 30. There is a case where a connector to which the end portion of the cover wire group G3 is connected is disposed on the sheet 30. Two cover wires 20*b*11 and 20*b*12 belong to the cover wire group G3.

A hole 32*b* is formed in the sheet 30*b*. FIG. 6 illustrates eleven holes 32*b*. The eleven holes 32*b* are formed in position corresponding to the exposed core wires 22 in the cover wires 20*b*1 to 20*b*10. Two holes 32*b* are formed in positions corresponding to the exposed core wires 22 in the cover wire 20*b*1.

Eleven cover wires 20*c*1 to 20*c*11 are illustrated in the wiring body 12*c*. All of the eleven cover wires 20*c*11 and 20*c*11 belong to the cover wire group G2. A hole 32*c* is formed in the sheet 30*c*. FIG. 6 illustrates eleven holes 32*c*. The eleven holes 32*c* are formed in position corresponding to the exposed core wires 22 in the cover wires 20*c*1 to 20*c*11. The hole 32*b* and the hole 32*c* are arranged in the same arrangement. Accordingly, the sheet 30*b* and the sheet 30*c* can be stacked so that all of the corresponding holes 32*b* and 32*c* overlap with each other.

The cover wires 20*c*1 and 10*c*2 are connected to the cover wire 20*b*1. The cover wires 20*c*3 to 20*c*11 are connected to the cover wires 20*b*2 to 20*b*10, respectively. Each connection part 26 is provided on the end portion of the cover wire 20. The end portion of the cover wire 20 indicates a portion where a connection destination is not provided on a further tip side thereof.

The plurality of connection parts 26 are arranged in a step-like form. The connection part 26 of the cover wire 20*b*1 and the cover wires 20*c*1 and 20*c*2 serves as a top part. Each connection part 26 of the cover wires 20*b*2 to 20*b*7 and the cover wires 20*c*3 to 20*c*8 is arranged on a left side of the top part. Each connection part 26 of the cover wires 20*b*2 to 20*b*7 and the cover wires 20*c*3 to 20*c*8 is located away from the top part along a longitudinal direction of the sheet 30*b* with a distance from the top part along a width direction of the sheet 30*b*. Each connection part 26 of the cover wires 20*b*8 to 20*b*10 and the cover wires 20*c*9 to 20*c*11 are arranged on a right side of the top part. Each connection part 26 of the cover wires 20*b*8 to 20*b*10 and the cover wires 20*c*9 to 20*c*11 is located away from the top part along the longitudinal direction of the sheet 30*b* with a distance from the top part along the width direction of the sheet 30*b*.

The number of the connection parts 26 disposed on both sides of the top part is different, but may be the same as each other. A width dimension of a portion extending to the both sides of the top part is different in the sheet 30*b*. That is to say, in the example illustrated in FIG. 4, the number of the connection parts 26 on the right side of the top part is smaller, thus the width dimension of a portion of the sheet 30*b* extending to the right side of the top part is smaller than that of a portion thereof extending to the left side of the top part. The width dimension of the portion extending to the both sides of the top part may be the same in the sheet 30*b*.

The sheet 30*b* and the sheet 30*c* extend from the position of the connection part 26 in direction intersecting with each other. Accordingly, the wiring body 12*b* and the wiring body 12*c* can be easily branched in different directions. Herein, the hole 32*b* is formed in the intermediate portion of the sheet 30*b* in the longitudinal direction. The hole 32*c* is formed in the end portion of the sheet 30*c* in the longitudinal direction. The sheet 30*c* extends in a direction intersecting with the longitudinal direction of the sheet 30*b* (herein, a direction perpendicular to the longitudinal direction thereof). Needless to say, the hole 32*b* may be formed in a position of the end portion of the sheet 30*b* in the sheet 30*b*. In this case, the plurality of wiring bodies 12 are connected at positions of the end portions. The hole 32*c* may be formed in a position of the intermediate portion of the sheet 30*c* in the sheet 30*c*. In this case, the plurality of wiring bodies 12 are connected at positions of the intermediate portions.

All of the cover wires 20*c*1 to 20*c*11 located on the end portion of the sheet 30*c* are connected to the cover wires 20*b*1 to 20*b*10. Accordingly, the connection part 26 of the wiring body 12*b* and the wiring body 12*c* can double for portion of a so-called wire-to-wire connection using a connector.

The cover wires 20*c*1 to 20*c*11 extend to one side (a lower side in FIG. 4) from the connection part 26. The cover wires 20*b*11 and 10*b*12 are disposed on the other side (an upper side in FIG. 4) of the connection part 26. That is to say, in the wiring body 12*b*, the cover wires 20*b*11 and 20*b*12 which are not used for connection to the wiring body 12*c* are disposed in a position deviating to a lateral side of the all the holes 32*b* used for connection to the wiring body 12*c* when seen from the longitudinal direction. Accordingly, the intersection of the cover wires 20*b*11 and 20*b*12 which are not used for connection to the wiring body 12*c* and the cover wires 20*c*1 to 20*c*11 is suppressed.

The insulation cover part partitions the connection part 26 in a position between the plurality of holes 32 in one sheet 30. Herein, as illustrated in FIG. 5, the cover 40 is joined to a portion of the sheet 30*c* between the holes 32 (a joint part A1). A fold part in the sheet 30*b* is joined to a portion of the sheet 30*b* between the holes 32 (a joint part A2). Furthermore, a portion of the sheet 30*b* between the holes 32 and a portion of the sheet 30*c* between the holes 32 are joined (a joint part A3). Accordingly, a short circuit caused by a direct contact between the plurality of connection parts 26 is suppressed. Furthermore, a short circuit between the plurality of connection parts 26 via water, for example, is also suppressed.

Also according to the wiring member 110 having the above configuration, the cover wires 20 can be connected in the region where the hole 32 is formed. The cover wires 20 are easily connected in a certain position in the sheet 30.

According to the wiring member 110, the cover wires 20 fixed to the different sheets 30*b* and 30*c* can be connected. The connection part 26 is provided on the end portion of the cover wire 20, thus the end portion of the electrical wire can be connected. The sheet 30*b* and the sheet 30*c* extend from the position of the connection part 26 in directions intersecting with each other, thus the branch extending in the different direction is simply formed.

The plurality of connection parts 26 are provided, and arranged in the step-like form, thus the intersection of the cover wires 20*b*1 to 20*b*10 and the cover wires 20*c*1 to 20*c*11 at the position of the covering layer 24 is suppressed. Accordingly, increase in thickness dimension of the wiring member 110 can be suppressed. However, the plurality of connection parts 26 need not be arranged in a step-like form. The plurality of connection parts 26 are arranged in a step-like form on both sides from the top part, but may be arranged in a step-like form only on one side from the top part.

The cover wires 20c1 to 20c11 extend on one side from the connection parts 26, and the cover wires 20b11 and 20b12 are disposed on the other side of the connection part 26, thus the intersection of the cover wires 20b11 and 20b12 and the cover wires 20c1 to 20c11 is suppressed. Accordingly, increase in thickness dimension of the wiring member 110 can be suppressed.

The insulation cover part partitions the connection part 26 in a position between the plurality of holes 32, thus a short circuit of the plurality of connection parts 26 is suppressed.

The wiring body 12b and the wiring body 12e overlap with each other so that the sheet 30c intervenes between the cover wires 20b1 to 20b12 and the cover wires 20c1 to 20c11 along the thickness direction. The wiring body 12b and the wiring body 12c may overlap with each other so that the sheets 30b and 30c do not intervene between the cover wires 20b1 to 20b12 and the cover wires 2001 to 20c11 along the thickness direction. The wiring body 12b and the wiring body 12c may overlap with each other so that the sheet 30b intervenes between the cover wires 20b1 to 20b12 and the cover wires 20c1 to 20c11 along the thickness direction. The wiring body 12b and the wiring body 12c may overlap with each other so that both the sheets 30b and 30c intervene between the cover wires 20b1 to 20b12 and the cover wires 20c1 to 20c11 along the thickness direction.

Embodiment 3

Figure 7:
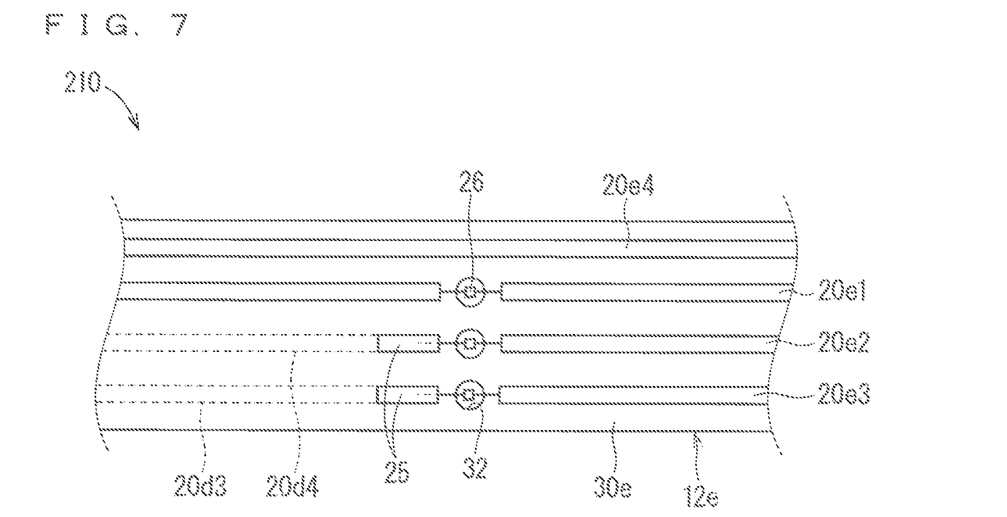
FIG. 7 is a plan view illustrating a wiring member according to an embodiment 3.
Figure 8:
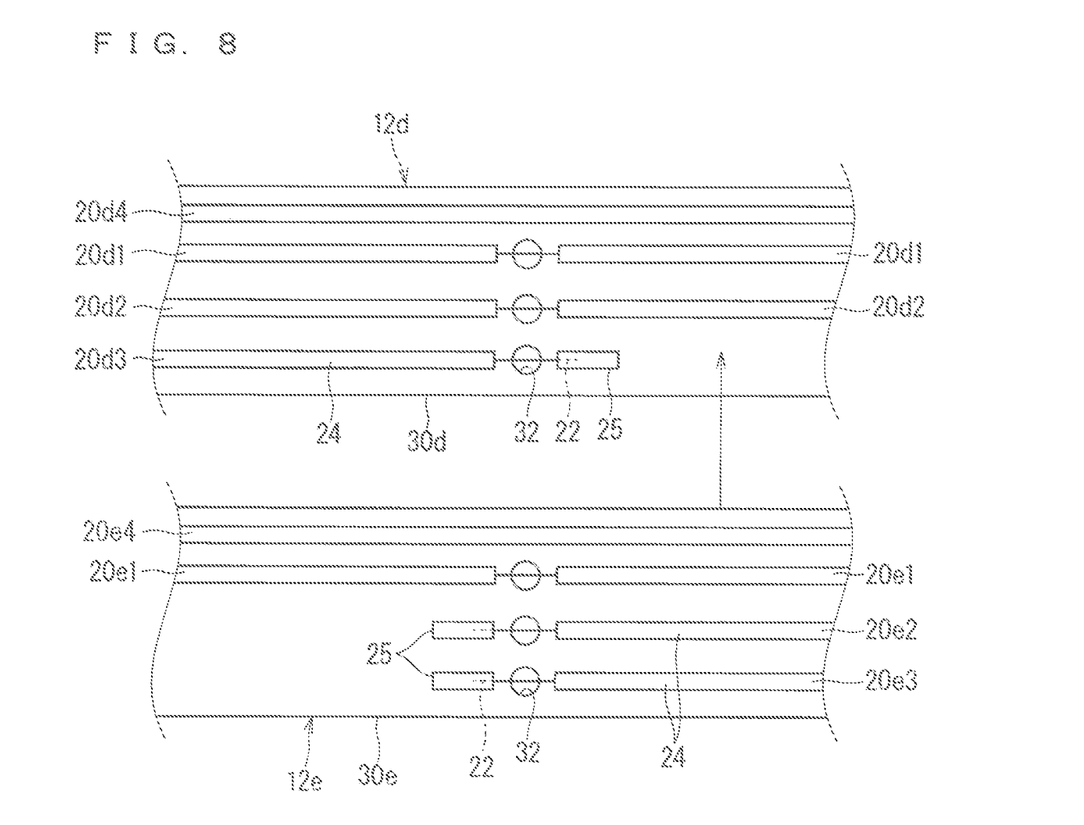
FIG. 8 is an explanation diagram illustrating a manufacture of the wiring member according to the embodiment 3.

A wiring member according to an embodiment 3 is described. FIG. 7 is a plan view illustrating a wiring member 210 according to the embodiment 3. FIG. 8 is an explanation diagram illustrating a manufacture of the wiring member 210 according to the embodiment 3. In the following description of the present embodiment, the same reference numerals are assigned to the similar constituent elements described above, and the description thereof will be omitted.

The wiring member 210 is made up of two wiring bodies 12d and 12e stacked on each other. The wiring body 12d includes a plurality of cover wires 20d1 to 20d4 and a sheet 30d. The wiring body 12e includes a plurality of cover wires 20e1 to 20e4 and a sheet 30e. In the present example, the sheet 30d and the sheet 30e extend from the position of the connection part 26 in the same direction.

Four cover wires 20d1 to 20d4 include two cover wires 20d1 and 20d2 belonging to the cover wire group G1, one cover wire 20d3 belonging to the cover wire group G2, and one cover wire 20d4 belonging to the cover wire group G3. Four cover wires 20e1 to 20e4 include one cover wire 20e1 belonging to the cover wire group 31, two cover wires 20e2 and 20e3 belonging to the cover wire group G2, and one cover wire 20e4 belonging to the cover wire group G3. The cover wires 20d1 and 20e1 are connected to each other. The cover wires 20d2 and 20e2 are connected to each other. The cover wires 20d3 and 20e3 are connected to each other.

The covering layer 24 is located closer to a tip side of the end portions of the cover wires 20d3, 20e2, and 20e3 than the core wire 22. The covering layer 24 located closer to the tip side of the end portion of the cover wire than the core wire 22 is referred to as a tip covering layer 25 in some cases. The tip covering layer 25 is fixed to the sheets 30d and 30e. The covering layers 24 and 25 are fixed to the sheet 30 in the positions on both sides of the exposed core wire 22, thus the exposed core wire 22 can be easily positioned in the position crossing the hole 32 also in the end portion of the cover wire 20.

The tip covering layer 25 is formed as described hereinafter, for example. That is to say, normally, when the covering layer 24 is peeled in the end portion of the cover wire 20, a cut line is firstly formed inn an intermediate position of the covering layer 24, and the covering layer 24 on the tip side is separated. Then, the separated covering layer 24 on the tip side is moved to the tip side of the core wire 22 and comes out of the core wire 22. Herein, the separated covering layer 24 on the tip side is not taken out of the core wire 22 but is stopped after being moved to the tip side of the core wire 22. The tip covering layer 25 is thereby formed. In this case, the tip covering layer 25 may include a portion protruding to the tip side of the core wire 22 along the longitudinal direction and does not cover the core wire 22. A portion of the moved covering layer 24 on the tip side which does not cover the core wire 22 may be removed. In this case, the tip covering layer 25 may cover the core wire 22 in the whole portion along the longitudinal direction.

Also according to the wiring member 210 having the above configuration, the cover wires 20 can be connected in the region where the hole 32 is formed. The cover wires 20 are easily connected in a certain position in the sheet 30.

According to the wiring member 210, the tip covering layer 25 is located closer to the tip side of the end portions of the cover wires 20d3, 20e2, and 20e3 than the core wire 22. The tip covering layer 25 is fixed to the sheet 30, thus the core wire 22 on the end portion of the cover wire 20 is easily positioned in the position of the hole 32.

The sheet 30d and the sheet 30e extend from the position of the connection part 26 in the same direction, thus the cover wires 20 disposed on the different layers in the cover wires 20 extending in the same direction can be connected to each other.

In the present example, the core wires 22 connected in the connection part 26 do not intersect with each other. The core wires 22 connected in the connection part 26 may intersect with each other.

Modification Example

Figure 9:
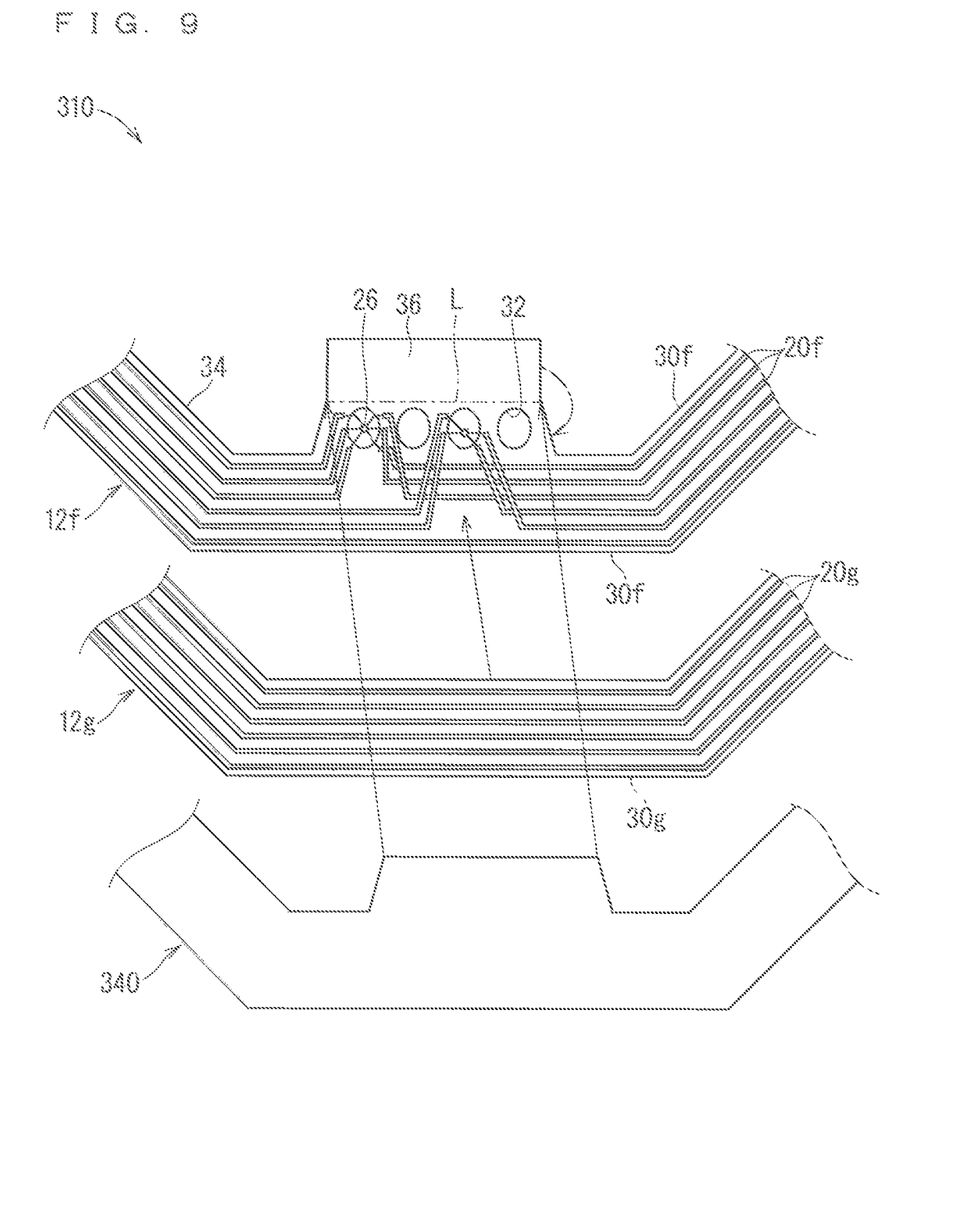
FIG. 9 is a plan view illustrating a modification example of the wiring member according to the embodiment 1.

FIG. 9 is a plan view illustrating a modification example of the wiring member 10 according to the embodiment 1. A wiring member 310 according to the modification example includes a wiring body 12f and a wiring body 12g stacked on each other.

A bending region part 36 is provided in a sheet 30f of the wiring body 12f. The bending region part 36 is a portion including a portion extending to be bended along the cover wire 20. The fold piece 34 of the insulation cover part is provided in a portion inwardly bended (a portion located on an inner periphery side in a plan view) in the bending region part 36. Herein, a yield of the sheet 30f tends to be reduced in the bending region part 36. The insulation cover part is provided in the portion inwardly bended in the bending region part 36, thus the yield of the sheet 30f can be improved. In the similar manner, also in a cover 340, the insulation cover part is provided in the portion inwardly bended in the bending region part 36, thus the yield of the sheet 340 can be improved.

A configuration similar to the wiring body 12 in the embodiment 1 can be adopted to a configuration of the wiring body 12f except that the bending region part 36 is provided.

The cover wire 20g of the wiring body 12g is not connected to the cover wire 20f of the other wiring body 12f in a certain position in the sheet 30g. In this manner, the wiring body 12g which is not connected to the other wiring body 12f may be stacked in a certain position of the sheet 30g in the wiring member 310. The configuration of the wiring body 12g is not limited to the configuration that the cover wire 20 is fixed to the sheet 30. The wiring body 12g may have a configuration that wire-like transmission members are kept in a state of being arranged on a base. For example, the wiring body 12g may be a flexible flat cable (FFC) or flexible print circuits (FPC).

Application Example

It is also considered that in the embodiment 2, the wiring body 12b serves as the wiring body 12 commonly used in vehicles of different types or grades, and the wiring body 12c serves as the wiring body 12 different in vehicles of different types or grades. In this case, the plurality of cover wires 20b1 to 20b10 may include a cover wire which is not connected to the cover wires 20c1 to 20c11. For example, it is also applicable that the eleven holes 32b illustrated in FIG. 6 may include a hole on which only the core wires 22 of the cover wires 20b1 to 20b10 are located, and the core wires 22 of the cover wires 20c1 to 20c11 are not located.

The configurations described in the embodiments and modification examples thereof can be appropriately combined as long as they are not contradictory.

EXPLANATION OF REFERENCE SIGNS 10, 110, 210, 310 wiring member
12, 12a to 12g wiring body
20, 20a1 to 20a6, 20b1 to 20b12, 20c1 to 20c11, 20d1 to 20d4, 20e1 to 20e4, 20f, 20g cover wire
22 core wire
24 covering layer
25 tip covering layer
26, 26a1, 26a2 connection part
30, 30a to 30g sheet
32, 32a to 32g hole
33 fold piece
34 bending region part
40 cover

The invention claimed is:
1. A wiring member, comprising:
at least one first cover wire, each of the at least one first cover wire including a first core wire and a first covering layer that covers the first core wire;
at least one second cover wire, each of the at least one second cover wire including a second core wire and a second covering layer that covers the second core wire; and
a first sheet to which at least the first cover wire is fixed, wherein
at least one first hole is formed in the first sheet,
at least one connection part where the first core wire of the first cover wire and the second core wire of the second cover wire are connected is located in a region where the first hole is formed,
the connection part is provided in an end portion of the first cover wire,
the first core wire extends in an intermediate part of the first covering layer on a tip side beyond the connection part in the end portion of the first cover wire, and the first core wire is shorter than the first covering layer of the first cover wire on the tip side such that a terminal end of the first core wire terminates in the intermediate part of the first covering layer, and
the first covering layer is fixed to the first sheet.
2. The wiring member according to claim 1, wherein the first and second core wires are welded in the connection part.
3. The wiring member according to claim 1, wherein the connection part is provided in an intermediate portion of the first cover wire.
4. The wiring member according to claim 1, wherein the first core wire of the first cover wire and the second core wire of the second cover wire intersect with each other.
5. The wiring member according to claim 1, wherein the second cover wire is fixed to the first sheet.
6. The wiring member according to claim 1, further comprising
a second sheet to which the second cover wire is fixed, wherein
a second hole is formed in the second sheet, and
the first sheet and the second sheet are stacked so that the first hole and the second hole overlap with each other.
7. The wiring member according to claim 6, wherein the first sheet and the second sheet extend from a position of the connection part in directions intersecting with each other.
8. The wiring member according to claim 7, wherein the at least one connection part comprises a plurality of connection parts, and
the plurality of connection parts are arranged in a step-like form.
9. The wiring member according to claim 8, further comprising
at least one wire-like transmission member, wherein
the wire-like transmission member is fixed to the first sheet, and is not connected to the first cover wire and the second cover wire, and
the second cover wire extends from the connection part to one side, and the wire-like transmission member is disposed on another side of the connection part.
10. The wiring member according to claim 6, wherein the first sheet and the second sheet extend from a position of the connection part in an identical direction.
11. The wiring member according to claim 1, wherein an insulation cover part covering the connection part is provided.
12. The wiring member according to claim 11, wherein the insulation cover part includes a portion formed by folding a part of the first sheet.
13. The wiring member according to claim 12, wherein a bending region part including a portion extending to be bended along the first cover wire is provided in the first sheet, and
the insulation cover part is provided in a portion inwardly bended in the bending region part.
14. The wiring member according to claim 11, wherein the at least one first hole comprises a plurality of first holes, and
the insulation cover part partitions the connection part in a position between the plurality of first holes.
15. The wiring member according to claim 1, wherein the first cover wire terminates at an intermediate part of the first sheet.

* * * * *